W. F. LAMB.
Game-Board.
No. 168,570.
Patented Oct. 11, 1875.
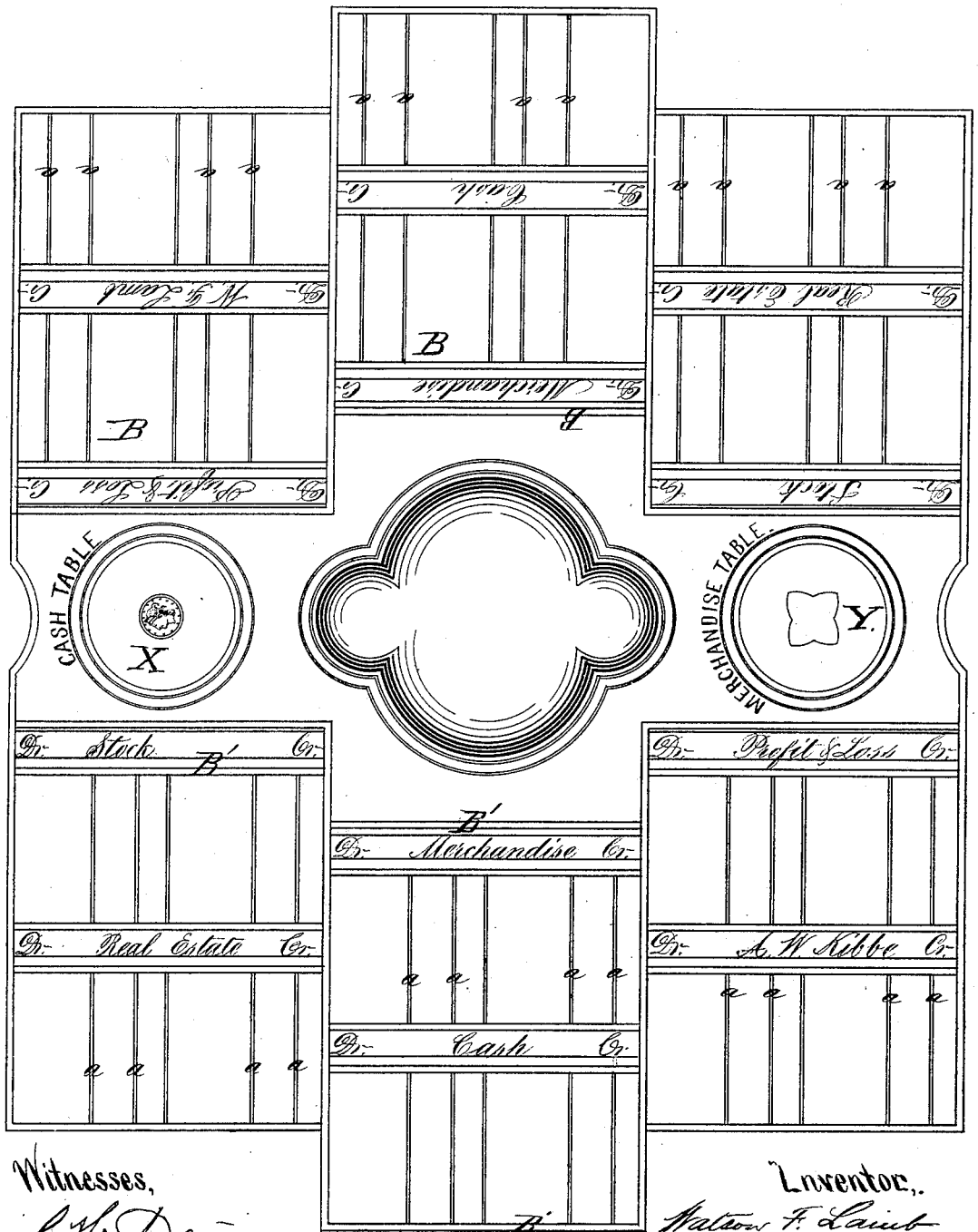

UNITED STATES PATENT OFFICE.

WATSON F. LAMB, OF WILBRAHAM, MASSACHUSETTS, ASSIGNOR TO HIMSELF AND JAMES B. ATWOOD.

IMPROVEMENT IN GAME-BOARDS.

Specification forming part of Letters Patent No. 168,570, dated October 11, 1875; application filed July 10, 1875.

*To all whom it may concern:*

Be it known that I, WATSON F. LAMB, of Wilbraham, in the State of Massachusetts, have invented a new and useful Book-Keeping Game-Board; and that the following is a full, clear, and exact description and specification thereof, reference being had to the accompanying drawing making a part of this specification, in which—

Figure 1 is a plan view of the tablet upon which the game is to be played.

The object of my invention is to teach, in an attractive manner, the principles of book-keeping, as applied to actual business transactions between two parties; and to this end my invention consists of a board or tablet, made of any desirable material, upon which are arranged two sets of accounts, one set on each side, each of which represents the accounts of the person playing with that set. A space may be set apart between the sets of accounts, or at any other convenient place on the tablet, upon which the throws representing the business transactions are made; and the game may be played with dice, dominoes, blocks, cards, or any similar device, having spots, points, or characters thereon, to represent the amount of each transaction—dice being preferable, as they may be placed in the columns of the accounts instead of making figures therein, in keeping the accounts in each game, and may be removed when the game is finished.

In the drawings, B B' represent two sets of accounts, one set on each side of the board, and that the principles of book-keeping may be made to appear as simple as possible, and thereby be more readily and easily understood, I use only six accounts on each side for each player, as follows: Stock account, real-estate account, merchandise account, cash account, profit and loss account, and the personal account of the player, each account having a debit and credit side, as kept in the ordinary ledger; and, that each transaction (indicated by each throw of the dice) may be more easily understood by the pupil, I arrange on the vacant space of the tablet, between the two sets of accounts, two tables, or places to throw the dice—one the "merchandise-table" Y, and the other the "cash-table" X, as indicated in the drawing.

In order to illustrate the variety of games which may be played on the tablet, and also the manner of teaching or of acquiring a knowledge of the principles of book-keeping by this invention, I will proceed to explain it, by supposing two parties, C. and D., to be playing a game, and suppose the first game, designated No. 1, has for its object the increase of the number of dots or spots on the Cr. side of stock account in five plays. For the first play each player throws the dice—C. on the "merchandise table" X, and D. on the "cash-table" Y. Suppose each throws four dots; they then take dice from the tray, and C. places four dots on the Cr. side of his "merchandise account," and four dots on the Dr. side of his "cash account." D. places four dots on the Cr. side of his "cash account," and four dots on the Dr. side of his "merchandise account." Thus each player places the number of dots he throws on the Cr. side of the account having the same name as the table on which he throws, and places the number his opposite or antagonist has thrown on the debit side of the account having the same name as the table on which his opposite threw his number.

In the next play, if D. throws three dots, or the number three on the "merchandise-table," and C. five on the "cash-table," D. places three on the Cr. side of his "merchandise account," five on the Dr. side of his "cash account," and two on the Cr. side of his "profit and loss account; C. places five on the Cr. side of his "cash account," three on the Dr. side of his "merchandise account,", and two on the Dr. side of his "profit and loss account." Thus, the player who throws the greater number of dots, or numbers representing the same, on either table, places the excess on the Dr. side of "profit and loss," and his opposite the same number on the Cr. side of "profit and loss account."

If at any time there are two blocks or dice with the same number of figures or dots on opposite sides of the same account, they cancel each other, and may be thrown off; or, if all the blocks or dice from the tray are in use, count the figures or dots on each side of any one account, subtract the less number from the greater, and place their difference on the side of the greater, throwing off all other blocks or dice from the account. At the end of the fifth play each player finds the difference between the two sides of his profit and loss account, takes a block or die from the tray, and places this difference on the smaller side of this account, thus making the two sides equal; and, finally, he takes the blocks or dice he has been throwing and places this same difference on the opposite side of stock account. If this difference comes on the Cr. side of stock account it will increase the number of digits or dots and win the game; but, if on the Dr. side, it must be subtracted from the Cr. side, and their difference placed on the Cr. side, throwing off the rest, thus showing a decrease in "stock." Another game can be commenced with the tablet as it now stands.

This game just described, and, for the purposes of illustration, designated No. 1, illustrates the variety of the same class of games which may be played upon this tablet.

Another game, however, which I designate No. 2, shows fully and clearly the whole system of book-keeping as applied to business transactions, and is played as follows, each dot or figure of the blocks or dice representing a financial value: The number of plays in each game should be agreed upon at the outset. The "stock account" represents the player's capital invested in the game. "Real-estate account" represents all dealings in houses and lands. "Merchandise" is an account of the dealings in goods of all kinds. "Cash" is an account of all moneys received and paid out. "Profit and Loss" is an account of the gains and losses. The personal account is an account with the opposite player.

Any other accounts may take the place of "merchandise" and "real estate," and tablets with other accounts added may be used, but those enumerated are quite sufficient to acquire a thorough knowledge of book-keeping by playing the game.

The plays may be made and the accounts kept by small cubes or blocks having the numerals from 1 to 6 stamped on the respective sides, and made of box-wood or similar material that will wear well, or ordinary dice may be used; but whatever is used, each digit, dot, or spot represents a certain amount of money agreed upon. In the present case, let each numeral or dot represent $100. Then each player places on the Dr. side of his "merchandise" account, for example, $600, as the amount of merchandise on hand; on the Dr. side of "cash" account $500, as the amount of cash on hand; on the Dr. side of "real-estate" account $600, as the amount of real estate owned; and their sum—$1700—on the Cr. side of "stock" account, as the amount of capital invested.

All sales of property are made on the "merchandise-table," and all payments of money are made on the "cash-table." All purchases "on time" are made on the personal account. Suppose C. throws the dice or number on the "merchandise-table," indicating that he will sell merchandise. Then D. throws his number or dice on the "cash-table," indicating that he will pay cash for his merchandise.

The dice or figures are then uncovered. C. finds that he has sold D. merchandise $200; for cash, $200; and D. finds that he has paid C. cash $200; for merchandise, $200. C. should then place $200 on the Cr. side of merchandise account, as merchandise sold; and $200 on the Dr. side of cash account as cash received; while D. places $200 on the Cr. side of cash account, as cash paid out, and $200 on the Dr. side of merchandise, as merchandise received.

I here insert a rule, which, being in rhyme, is more easily to be remembered:

All property at my command
    Upon the Dr. side must stand;
    All sales and payments which I make
    The Cr. side must therefore take.

At the second play D. throws on the merchandise-table, followed by C. on the cash-table. D. finds that he has sold C. merchandise $400, and received cash $500; C. therefore has paid cash $500, for merchandise, $400. D. then posts to the Cr. side of merchandise account $400, as merchandise sold; to the Dr. side of cash account $500, as cash received; and to the Cr. side of profit and loss $100, as his gain in the play. C. posts to the Cr. side of "cash" $500, as cash paid out; to the Dr. side of "merchandise" $400, as merchandise received; and to the Dr. side of profit and loss $100, as his loss in the play.

*Rule* 2d:

My loss I enter on the debit;
    Therefore my gain goes to the credit.

At the third play, C. desires to buy merchandise of D. on account—that is, having a certain time given (say, one, two, or three plays) to make the payment. D. throws on the "merchandise-table," and C. throws his dice or blocks on his personal account. D. finds that he has sold merchandise to C. on account $500, and C. has bought the same on account for $300. Both players then post to "merchandise" and "profit and loss" accounts according to rules 1 and 2. D. then posts $300 to the Dr. side of his account with C; and C. posts $300 to the Cr. side of his account with D.

*Rule* 3d:

When I owe you, you plainly see,
    I credit you, you debit me.

If C. does not pay his debt in the time specified, D. may take C.'s merchandise or real estate to the amount of the debt, and $100 more for damages.

If, in throwing a die or block, either player thereby offers for sale merchandise or other salable property more than he has on hand, he must buy a sufficient amount of the opposite player to fulfill the contract. To effect this the blocks or dice just thrown are set aside without disturbing the numbers thrown, and the necessary plays are made with other dice, after which the dice that have been set aside are replaced, and their postings made.

At the fourth play C. throws on the merchandise-table and announces real estate for sale. D. pays cash. They then make the postings to "real estate" and "cash" accounts according to rules given.

At the end of the game each player balances his accounts and carries the difference of his "profit and loss" to the "stock" account, as in the preceding game. "Stock" account will then show an increase or decrease of capital, thus deciding the game.

To insure accuracy in the game it is necessary to take an occasional "trial balance." This is done by adding the Dr. sides of all the accounts of one set, and also the Cr. sides, which two sums should be equal.

It is evident that other accounts might be substituted for those mentioned, and others added, but these are quite sufficient to accomplish the desired result.

It will be perceived that the whole theory and practice of book-keeping, which, by the ordinary process of teaching, is uninteresting and tedious, is presented to the pupil in an entirely different aspect, the dry details of the study being clothed with the interest of actual business, accompanied with the fascination of a game of chance, and all the rules required to learn it thoroughly are presented in a form most easily to be remembered.

In practice I should prefer to make the tablet upon which the game is played with the lines $a$ raised a little distance above the plane of the tablet, so that when a play was made, a block having the figures or characters on the sides indicating the value, or a die or dice taken from the tray representing the value or amount of the play, might quickly and readily be placed in the column representing dollars in each account, or be removed therefrom.

The box or tray in which the blocks or dice are to be kept may be made upon the board at any convenient point, if desired, or it may be made separate and accompany the board.

Having thus described my invention, what I claim as new is—

The game-board herein described, having the cash and merchandise tables X Y, upon which the throws are made, and the duplicate sets of subdivisions B B', headed, respectively, with different titles of accounts, substantially as described, and for the purpose set forth.

WATSON F. LAMB.

Witnesses:
T. A. CURTIS,
W. H. BRADWAY.